Feb. 16, 1954 S. H. GASCHE 2,669,332
VARIABLE-SPEED HYDRAULIC COUPLING
Filed Nov. 4, 1949 5 Sheets-Sheet 5
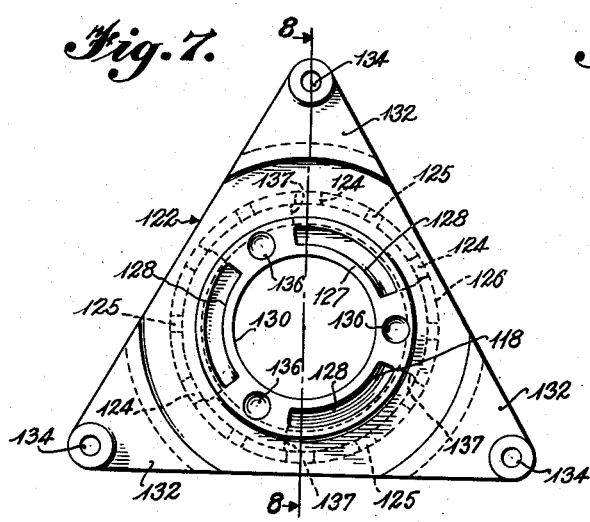
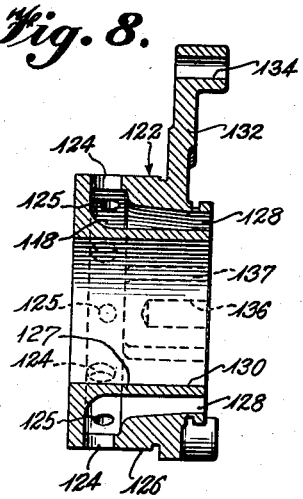
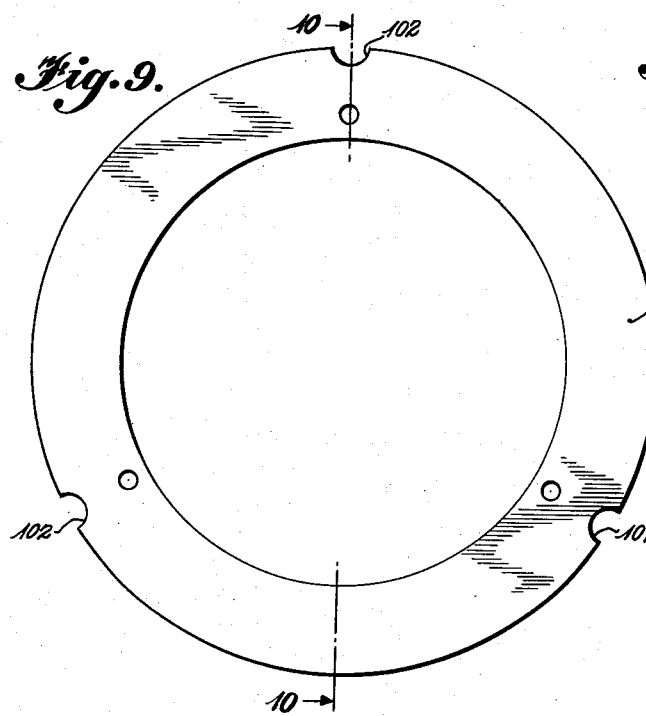
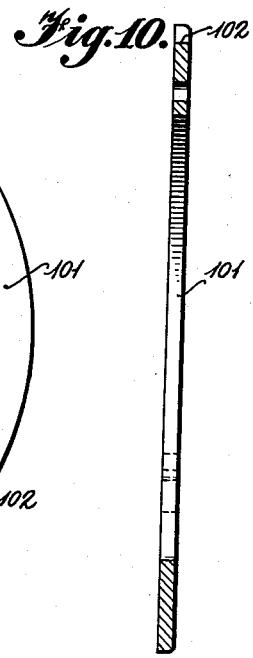
INVENTOR
Scott H. Gasche
BY
ATTORNEYS Patented Feb. 16, 1954

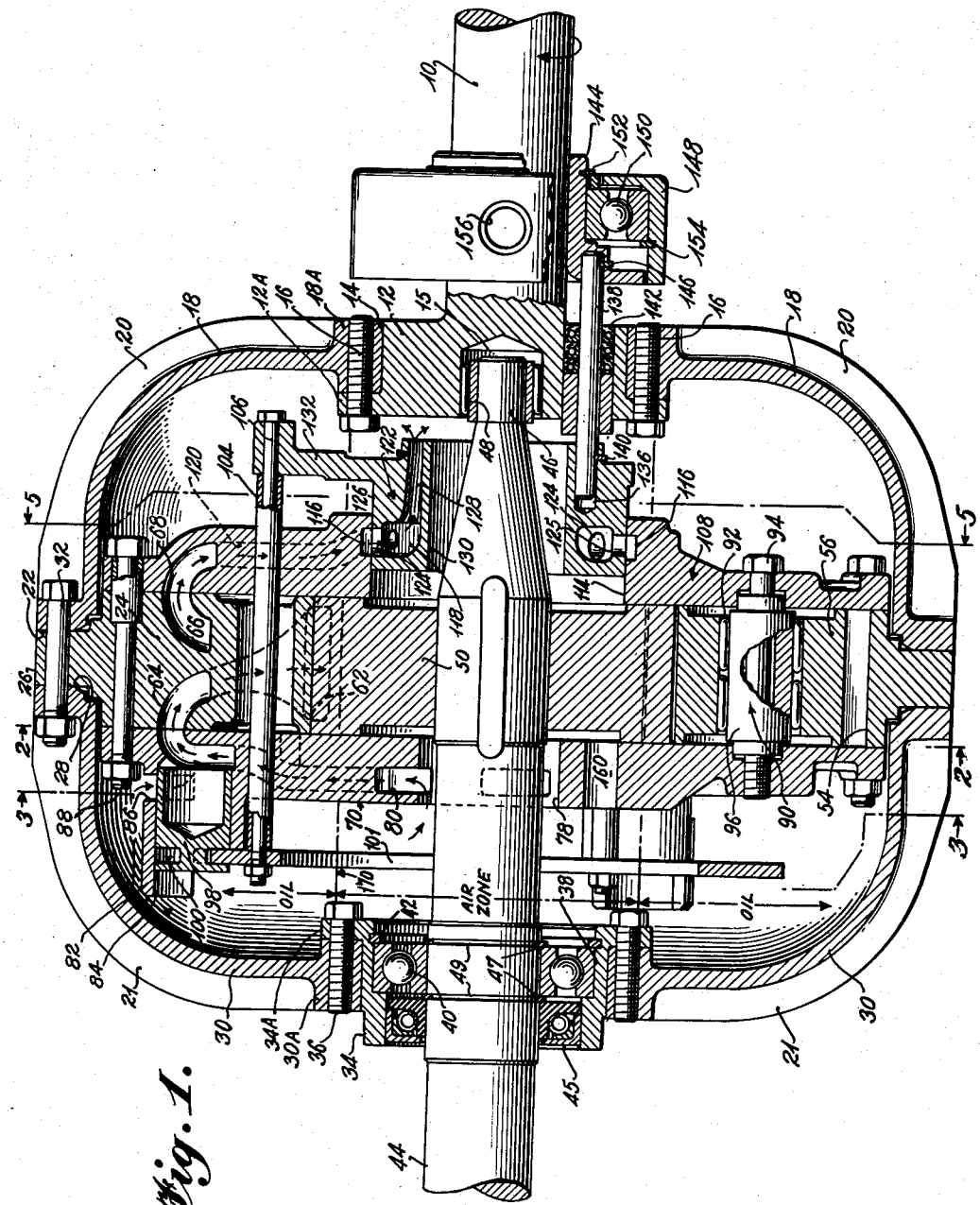

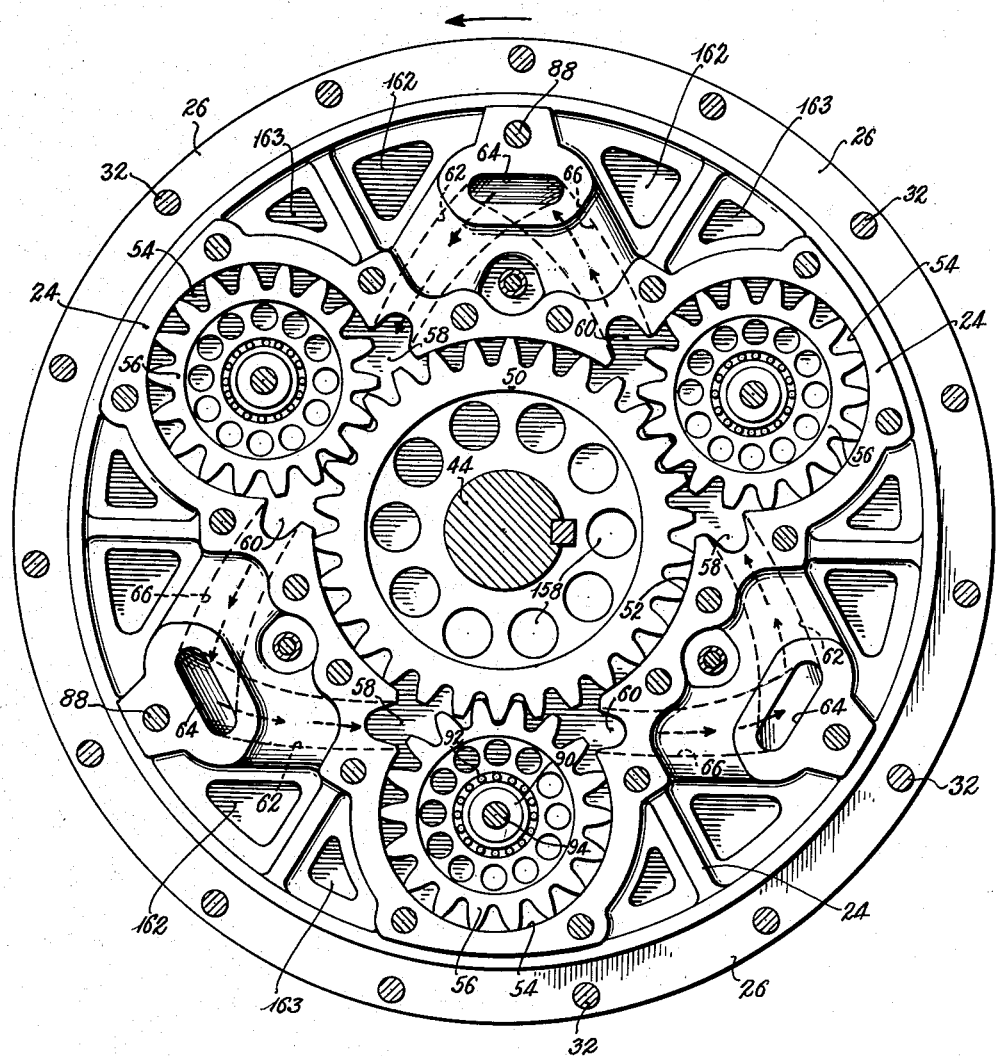

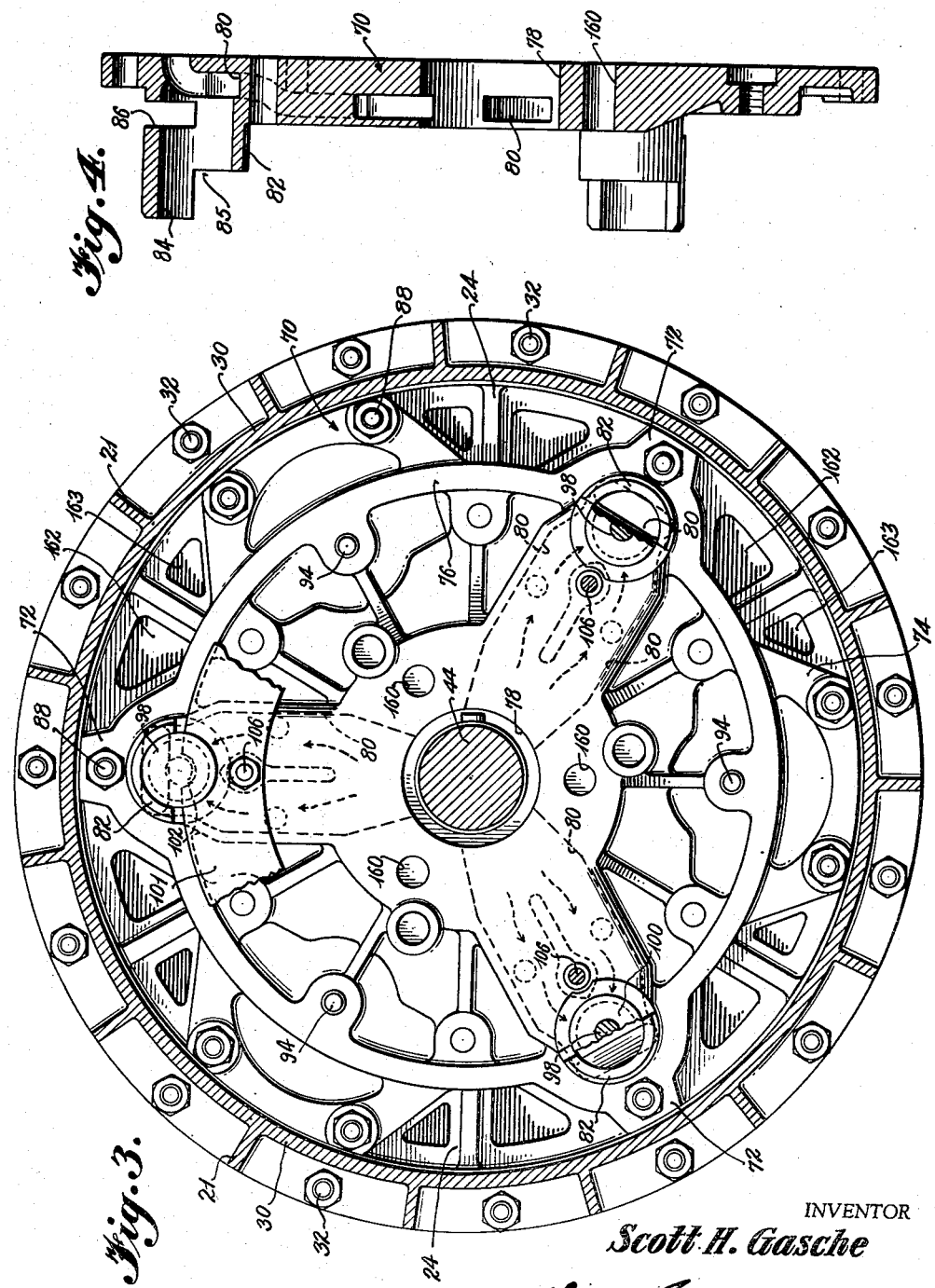

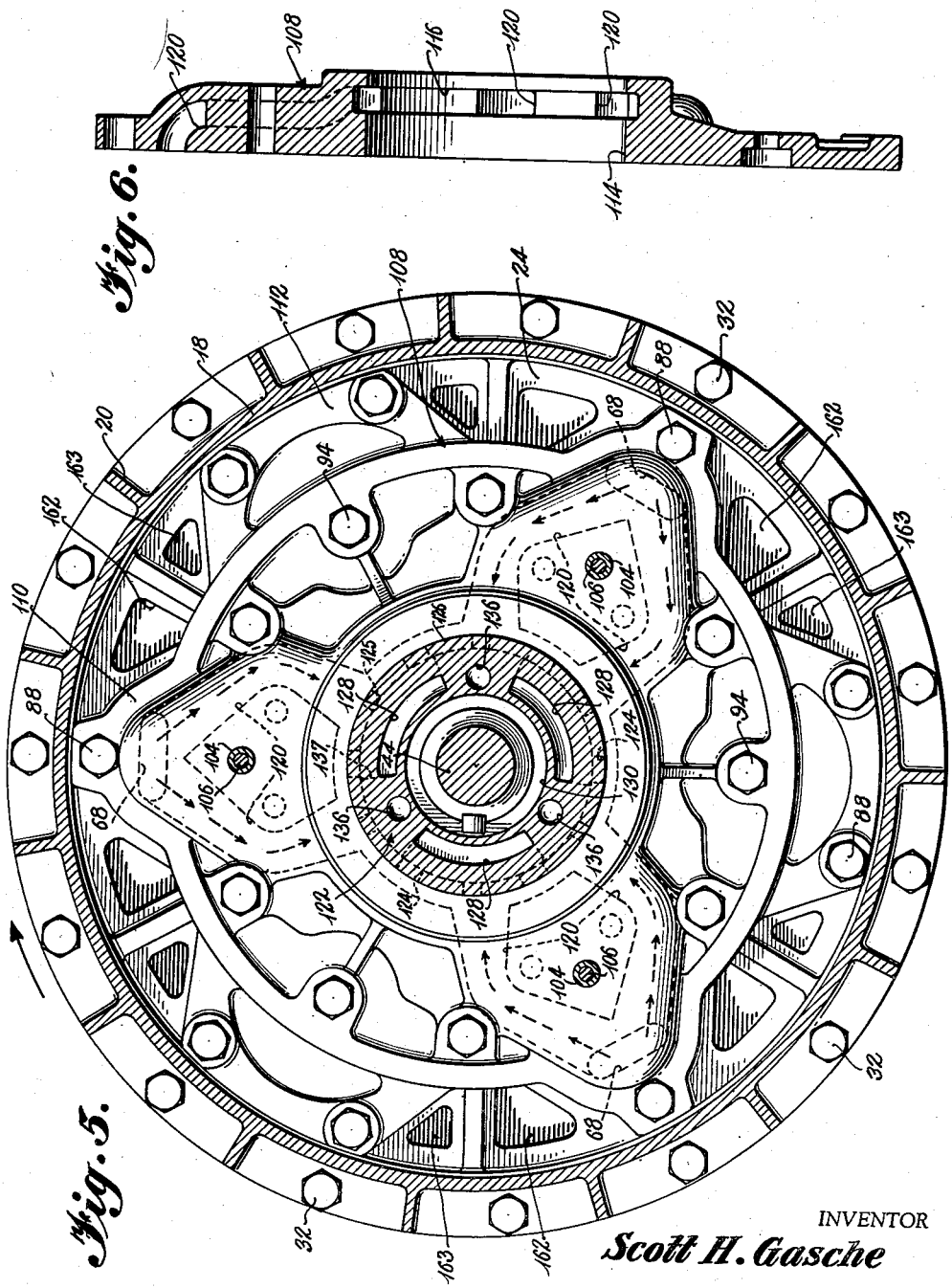

2,669,332

UNITED STATES PATENT OFFICE 2,669,332

VARIABLE-SPEED HYDRAULIC COUPLING

Scott H. Gasche, Wichita, Kans., assignor to Thomas Hydraulic Speed Controls, Inc., Wichita, Kans., a corporation of Kansas Application November 4, 1949, Serial No. 125,569

2 Claims. (Cl. 192—61)

This invention relates to improvements in variable speed hydraulic couplings or clutches of the type employing a rotatable casing driven by a prime mover and in which casing two fluids of different resistant value are employed independently as well as in mixtures of relatively varied proportions and wherein the control of the independent fluids and of their mixtures is effected through movable valve means adapted for metering and arresting the flow of the fluids passing through a fluid-circulating and power-transmitting instrumentality such as, for example, a gear type pump having elements operatively connecting the rotatable casing with a driven shaft extending into the casing.

According to the embodiment of the present invention disclosed in the attached drawings, the clutch casing is driven by a drive shaft affixed thereto and a driven shaft extends coaxially into the casing with the sun gear of a planetary gear type pump keyed thereto. The casing carries preferably a plurality of planetary gears meshing with the sun gear which is mounted on the driven shaft. In operation, the casing is partially filled with oil which occupies an annular space near the outer periphery of the casing when the latter is rotated by the driving shaft. During such operation the core or central portion of the space within the casing is occupied by air. During neutral operation, when it is desired that no coupling be established between the driving and driven shafts, only air is being admitted into the inlet ports of the pump and with the discharge control valve in open position the air is freely discharged into the central zone of air within the casing. Multiple oil intake control valves are provided within the outer zone of oil. It will be obvious that during such neutral operation the planetary gears together with the casing will rotate about the stationary sun gear and will be effecive to pump only air which is freely discharged into the central air space within the casing. While only air is being circulated through the pump because the oil inlet valves are in closed positions, no drive from the driving shaft to the driven shaft is transmitted since the movement of air through the pump offers no appreciable resistance.

When it is desired to establish a driving connection between the shafts, the intake control valves and the single discharge control valve may be concurrently operated to establish communication between the pump port system and the annulus of oil within the casing. During the rotation of the casing and annulus of oil therein, the centrifugal force acting on the oil and the suction created by the pump gears will cause a flow of oil into the pump for admixture with the air when the intake and discharge control valves are simultaneously shifted and since the discharge ports are adapted to be progressively restricted by the discharge control valve while the oil intake valves are progressively opened considerable resistance to the pumping effort is introduced and this resistance manifests itself in an attempt of the planetary gears to drag the sun gear around with them, thus imparting a progressively increased speed to the driven shaft. When the inlet ports are completely open, the discharge ports will be completely closed and the arrangement is such that the communication between the inlet ports and the air core still remains open. However, since the oil inlet ports are now completely open, the tendency of the pump gears to draw in oil will completely predominate over the tendency of air to enter the pump and the pump circuit will then be completely filled with oil alone. Since the discharge ports are completely closed, the planetary gears will be unable to rotate relatively to the sun gear to effect pumping and the driven and driving shafts will thus be locked together in substantially 1-to-1 driving relationship in the desired direction of rotation.

Generally, couplings of the above-described type are known and the present invention is directed to improvements in valve and manifold structures for the inlet and discharge ports of the power-transmitting pumping means of such couplings.

It is, therefore, an object of this invention to provide novel fluid control means for the fluid-circulating and power-transmitting pumping means of a variable speed hydraulic coupling comprising improvements in valve structure and arrangement over valves heretofore used.

A further object of the invention resides in the provision of certain improvements in a type of hydraulic coupling comprising: a rotatable casing partially filled with oil to provide therein, during its rotation, an outer annular zone of oil and an inner central zone of air, pumping means disposed within the casing having elements operatively connected to the casing and to a driven shaft and also having intake and discharge manifold plates on opposite sides thereof; the improvements including the intake manifold plate containing a plurality of radially disposed air intake passages extending from their inner constantly open inlet ends within the zone of air and having outer ends discharging into the pumping means within the zone of oil, a plurality of oil inlet passages in the intake manifold for discharging oil into the discharge ends of the air intake passages, an oil inlet control valve for each oil intake passage disposed within the zone of oil, an element operatively connecting all of the oil intake control valves, the discharge manifold containing a plurality of radially disposed fluid discharge passages having inlet ends communicating with the pumping means and having discharge ends communicating with a pressure-stabilizing groove formed within a valve seat in the discharge manifold, a single cylindrical discharge control valve movably mounted on the discharge manifold valve seat for controlling fluid discharge from the pressure-stabilizing groove, means operatively connecting the connecting element for the oil intake control valves with the single discharge control valve, and means operatively connected with the discharge control valve extending outwardly from within the casing to afford simultaneous control of all of the valves exteriorly of the casing during its rotation.

It is a further object of this invention to provide novel control valves and manifolds for a hydraulic coupling that are of simple construction, may be economically produced, and which are so arranged as to permit easy assembly and disassembly.

Other objects and advantages will become apparent to those skilled in the art as the description proceeds in connection with the accompanying drawings wherein:

Fig. 1 is a longitudinal sectional view through a hydraulic coupling embodying the present invention.

Fig. 2 is a transverse sectional view taken substantially along the line 2—2 of Fig. 1.

Fig. 3 is a sectional view taken substantially along the line 3—3 of Fig. 1 with certain bolts being omitted for clarity of illustration, some parts being broken away, and a portion only of the ring connecting the intake valves being shown.

Fig. 4 is a diametral sectional view of the intake manifold also shown in Fig. 1.

Fig. 5 is a transverse sectional view taken substantially along the line 5—5 of Fig. 1 looking in the direction of the arrows.

Fig. 6 is a diametral view of the discharge manifold employed in the present invention.

Fig. 7 is an elevational view of the discharge control valve.

Fig. 8 is a sectional view of the discharge control valve taken substantially along the line 8—8 of Fig. 7.

Fig. 9 is an elevational view of the ring connecting the intake control valves of the present invention and, Fig. 10 is a sectional view of the ring shown in Fig. 9 taken substantially along the line 10—10 of Fig. 9.

Referring now specifically to Fig. 1, there is shown a drive shaft 10, which may be driven by any suitable prime mover or may constitute the armature shaft of an electric motor or the crankshaft of an internal combustion engine. The drive shaft 10 is provided with an enlarged head 12 having a cylindrical side 14 and a flange 12A and a central axial bore 15 extending into its inner end. The shaft head 12 is positioned within the cylindrical hub portion 18A of the casing half-section 18 and bolted thereto as by bolts 16. The casing half-section or member 18 is provided with outwardly projecting ribs 20 which function as strengthening elements and also as cooling fins. The casing member 18 is provided at its outer periphery with a planar seat 22.

A pump body or carrier member 24 is provided with an outwardly extending peripheral flange 26 having one face seated against the seat 22 of the casing member 18 and its opposite face seated against a seat 28 on a second casing half-section or member 30. The casing member 30 is identical to the casing member 18 and bolts 32 extend through the peripheral portions of the casing members 18 and 30 and the flange 26 of the pump body 24 to thereby hold these members in rigid assembled relationship. The casing member 30 is provided with ribs 21, identical to the ribs 20.

Within its cylindrical hub portion 30A, the casing member 30 supports a cylindrical flanged bearing sleeve 34, assembled thereto by any suitable means, such as cap screws 36 which pass through the sleeve flange 34A. The sleeve 34 is provided with a seat 38 for the outer race of a ball bearing assembly 40. A split ring retainer 42 may be provided to retain the ball bearing assembly 40 in position within the sleeve 34.

The ball bearing assembly 40, just described, rotatably supports a driven or output shaft 44 coaxial with the drive shaft 10. The driven shaft 44 extends axially through the casing and its reduced end portion 46 is rotatably supported in a needle bearing 48 mounted within the central bore 15 in the head 12 of the drive shaft 10. A centrally disposed sun gear 50 (see also Fig. 2) is rigidly secured, as by key 43, to the driven shaft 44 in a position to lie within the axial center of the pump body 24. The shaft 44 is provided with parallel grooves 49 to receive split rings 47 engaging opposite sides of the ball bearing assembly 40. There is also provided a suitable sealing ring assembly 45 between the sleeve 34 and the shaft 44 to exclude foreign matter from the bearing 40 and to prevent leakage of oil from the interior of the casing.

Referring to Fig. 2, it will be seen that the pump body 24 is provided with a cavity 52 of a diameter to snugly receive therein the sun gear 50, the cavity 52 having segmental openings opposite the planetary gears 56 where same mesh with the sun gear 50. The pump body 24 is also provided with a plurality of cavities 54 for the planetary gears 56 which operatively mesh with the sun gear 50. The pump body cavities 54 are of a diameter to snugly receive therein the planetary gears 56. The spaces 58 on one side of each of the pump couples (comprised by one of the planetary gears 56 and the sun gear 50) constitute inlet chambers for the pump and the spaces 60 on the opposite sides of each couple constitute outlet or discharge chambers for the pump. Each of the inlet chambers 58 is connected by a passage 62 with an inlet port 64 opening through one face of the pump body 24. In like manner, each of the discharge chambers 60 is connected by a passage 66 with a discharge port 68 opening through the opposite face of the pump body 24 (see Fig. 1); the openings for the inlet ports 64 and the openings in the opposite face of the pump body for the discharge ports 68 being axially aligned.

The fluid intake manifold 70 (see Figs. 1, 3 and 4) comprises a generally circular plate having outwardly extending ears 72 and 74. The central circular portion 76 of the intake manifold is of lesser diameter than the interior of the casing and the ears 72 and 74 are so positioned and of such dimensions as to extend over respectively the inlet ports 64 of the pump body 24 and the cavities 54 for the planetary gears 56. The intake manifold plate 70 is provided with a central cylindrical opening 78 within the zone of air, somewhat larger than the outer diameter of the shaft 44, and generally radial unvalved air intake passages 80 extend within the manifold plate 70 from said central opening 78 to within the portions of the ears 72 overlying the inlet ports 64. Also overlying the inlet ports 64 are the tubular bosses 82 integral with and extending axially of the manifold plate 70. These bosses 82 are provided with cylindrical bores 84 extending therethrough axially of the assembly and communicating with the outermost ends of the passages 80 and with the inlet ports 64. Extending into the outer portion of the tubular wall of each of the bosses 82 is a semi-circular slot 86 establishing communication between the interior of the cylindrical bore 84 and the oil annulus within the peripheral portion of the interior chamber of the coupling casing. The intake manifold plate 70 is secured to one end face of the pump body 24 as by means of bolts 88. The intake manifold plate 70 also constitutes a support for one end of each of the tubular spindles 90 upon which the planetary gears 56 are mounted for rotation upon needle bearings 92 or the like. As shown in Fig. 1, the spindles 90 are secured to the intake and discharge manifolds by central cap screws 94. The spindles 90 have reduced end portions snugly received in accurately positioned counterbores in the manifold plates 70 and 108. The widths of the rim portion of the sun gear 50 and those of the planetary gears 56 are substantially equal to the thickness of the pump body 24 so that the inner faces of the manifolds 70 and 108 when tightly secured to the pump body 24 by bolts 88 just contact the opposite rim faces of the gears 50 and 56 to thus define substantially fluid-tight spaces between the teeth of the gears, all in a well-known manner.

Each of the bores 84 in the tubular bosses 82 slidably receives therein an oil intake control valve 98 of generally hollow cylindrical shape which is provided on its outer face with an arcuate recess preferably in the form of a circumferential groove 100 adjacent its outermost end. The valves 98 are simultaneously axially outwardly slidable in the bores 84 from their innermost positions wherein the valves completely close the oil inlet slots 86, as shown in Fig. 1; however, when the intake valves 98 are in such closed positions they do not close the outer ends of the air intake passages 80. The valves 98 are preferably simultaneously movable outwardly to a position wherein the oil inlet slots 86 are completely uncovered, thus establishing communication between the oil annulus in the interior of the coupling casing and the bores 84.

An intake valve connector ring 101 (see also Figs. 9 and 10) is so dimensioned that when placed concentrically about the driven shaft 44 its outer periphery extends into the recesses or grooves 100 in the valves 98. The connector ring 101 is preferably provided with substantially semi-circular notches 102 in its periphery to partially embrace the "neck" portion of the valves 98 at the bottom or base of the grooves 100. These notches 102 offset any tendency of the ring 101 to rotate about the axis of the coupling relatively to the pump body and manifold due to inertia or other causes.

As best shown in Fig. 4 the cylindrical bosses 82 each have a semicircular portion cut away on their inner sides, as at 85, which permits axial movement of the connector ring 101 while providing an arcuate bearing support for the valve 98 radially outwardly of the ring 101. The outwardly extended arcuate bearing supports thus provide guide surfaces for the valves 98 during their sliding movements in the bores 84.

The ring 101 is supported, for axial sliding movement in the assembly, on and movable by a plurality of axially extending valve-connecting rods 104 slidably movable through the intake manifold 70, the pump body 24, and through the discharge manifold 108 to be described later. The connecting rods 104 may be in the form of hollow tubular sleeves extending from the inner face of the ring 101 to the inner face of an outer portion of a discharge control valve 122, to be described later, and may be held assembled thereto by means of through bolts 106. The rods 104 not only support the ring 101 for axial movement in the assembly but also constitute actuating means therefor in a manner that will be described hereafter.

Referring now to Figs. 1, 5 and 6, there is shown a discharge manifold plate 108 attached to the adjacent face of the pump body 24 axially opposite the intake manifold plate 70. The discharge manifold 108 is provided with an axially disposed circular opening 114 and outwardly extending ears 110 and 112. The ears 110 are so positioned as to overlie the pump discharge ports 68 and the ears 112 are so dimensioned and positioned as to overlie and enclose the adjacent ends of the pump body cavities 54 in which the planetary gears 56 are rotatably mounted. The manifold plate 108 is held assembled to the pump body 24 by means of the same bolts 88 previously referred to, and also constitutes a support for the adjacent ends of the spindles 90 upon which the planetary gears 56 are mounted. The central bolts or cap screws 94, previously referred to, further act to hold the manifold plates in assembled relation to the pump body 24.

As more clearly shown in Figs. 1 and 6, the discharge manifold plate 108 is provided with a central axial cylindrical bore 114 which is somewhat larger in diameter than the central opening 78 of the intake manifold 70 and constitutes a valve seat. In the inner periphery of the bore 114 is a circumferential inwardly extending pressure-stabilizing groove 116. The discharge manifold 108 is provided with a plurality of discharge passages 120 extending outwardly from the groove 116 and thence arcuately outwardly through the inner face of the manifold plate 108 into communication with the pump body discharge ports 68 previously referred to.

A cylindrical fluid discharge control valve 122 (see Figs. 1, 7 and 8) is so dimensioned as to be snugly received within the bore 114 of the discharge manifold plate but capable of axial sliding movement therein. The valve 122 is provided with a plurality of circumferentially equally spaced openings 124 and 125 in its outer cylindrical wall 126 which communicate with an interior annular chamber 118 situated between the outer wall 126 and an inner cylindrical wall 127. A plurality of discharge passages 128 extend axially of the valve 122 and discharge through the outer end face thereof and communicate at their inner ends with the annular chamber 118. The clutch-driven shaft 44 extends through the central bore 130 of the valve. The valve 122 is also provided with a triangular plate like portion terminating in outwardly extending ears 132 which extend radially outwardly so that their outermost portions are in alignment with the valve connecting rods 104 previously described. The bolts 106 of the connecting rods previously referred to extend through openings 134 in the ears 132 to securely connect the discharge control valve 122 to the intake valve connector ring 101 to form an operational fluid intake and discharge control unit.

The outer face of the discharge control valve 122 is provided with a plurality of bores 136 for receiving therein the inner ends of valve shifter rods 138 which slidably extend through the enlarged head portion 12 of the driving shaft 10. The bores 136 extend into lugs 137 which are cast within the valve and constitute stiffeners integrally connecting the inner cylindrical wall 127 with the outer cylindrical wall 126 and are disposed between the discharge passages 128. The rods 138 may be provided with transverse grooves engageable by a split ring 140 to hold the rods 138 assembled to the discharge control valve 122. The control rods 138 pass through suitable packing glands 142 in the head 12 to prevent leakage of oil from the casing. At their outermost ends the rods 138 extend into openings in a rotatable shifter sleeve 144 and are held therein by means of a split ring 146 engaging transverse grooves near the ends of the rods 138. The shifter sleeve 144 is mounted on the drive shaft 10 for axial sliding movement therealong. There is no relative rotation between the shifter sleeve 144 and the shaft 10 since the shifter rods 138 rotate with the shaft. A non-rotatable shifter collar 148 is mounted about the shifter sleeve 144 as by means of a ball bearing assembly 150. A split ring 152 engaged in a groove in the sleeve 144 holds the inner race of the ball bearing in fixed relation to the sleeve 144 and a split ring 154 engages an internal groove in the shifter collar 148 to hold the outer race of the ball bearing against longitudinal movement relative thereto. The shifter collar 148 is provided with diametrically opposed studs 156 which are adapted to be continuously engaged within forked ends of a well known valve shifting lever to effect concurrent axial shifting movement of the sleeve 144, rods 138, discharge valve 122, connecting rods 104, connector ring 101 and intake valves 98.

As previously described, the discharge control valve 122 is provided with an enlarged central opening 130 which establishes communication between one end of the chamber within the casing and the inner side of the slidable discharge control valve 122. As shown in Fig. 2, the sun gear 50 is provided with a plurality of openings 158 extending axially through the web portion of this gear. As shown in Figs. 1, 3 and 4, the intake manifold 70 is provided with a plurality of axially extending openings 160 adjacent the central opening 78 and these openings 160 communicate with the space adjacent the web portion of the gear 50. The pump body 24 is also provided with pairs of open fluid passages 162 and 163 which extend transversely through same near the periphery thereof inwardly of the peripheral flange 26 and circularly between the manifold-securing bolts 88. Thus it will be seen that open passages for fluid flow are provided between opposite ends of the chamber within the casing through the paths defined by the openings 130, 158, 160, 162 and 163.

As previously described, the intake manifold 70 and the discharge manifold 108 include central circular portions of lesser diameter than the interior of the coupling casing and are also provided with circularly spaced outwardly extending ears 72, 74 and 110, 112 respectively. The spaces between the ears of the manifold plates are located between the peripheral portions of the pump body 24 which contain the transverse openings 162 and 163 and which establish communication between the spaced end portions of the chamber within the coupling casing 18 and 30 adjacent the outer periphery, thus providing free passageways for oil from one side of the pump mechanism to the other.

Assume the parts to be in the relative positions illustrated in Fig. 1, and the coupling casing partially filled with oil to provide an oil annulus extending radially inward to the line indicated by numeral 170 during the rotation of the casing when the clutch is driven by the drive shaft 10 in neutral operation. During such neutral operation the oil will not be permitted to enter the pump inlet ports 64 through the oil inlet slots 86 since the latter are closed by the slidable intake control valves 98. During such neutral operation, the driven shaft 44 will remain in substantially stationary position while the rotation of the pump body 24 together with the coupling casing will cause the planetary gears 56 to "roll" about the sun gear 50, thus functioning to pump only air from the central zone of air through the radial air intake passages 80 into the pump inlet ports 64 and, since the latter are in communication only with the air core within the axial or central portion of the casing, the pump mechanism will circulate only air therethrough and through the discharge manifold passages 120; the circulated air being freely discharged through the manifold discharge passages 120 into the pressure-stabilizing groove 116 and thence through the valve openings 124 and 125 and through the passages 128 of the discharge control valve 122 into the interior of the coupling casing. Such circulation of air alone will not be effective to transmit power to the driven shaft 44 against any appreciable resistance. As the drive shaft 10 and coupling casing continue to rotate, the valve mechanism comprising the three intake control valves 98 and the single discharge control valve 122 together with the connector ring 101 and the valve-connecting rods 104 may readily be progressively shifted inwardly as a unit by the shifter rods 138 and their actuating shifter collar 148. During this progressively inward shifting movement of the valve unit, a progressively decreased quantity of air will be caused to enter the pump to supply that volume of displacement not filled by the progressively increasing quantity of oil entering the pump through the slots 86. While the increased quantity of oil is entering the pump and while simultaneously the discharge from the pressure-stabilizing groove 116 is being progressively restricted a progressively increased resistance to the pumping action will be transmitted to the sun gear resulting in a progressively increased rotation of the driven shaft 44. If the valve mechanism is then moved inwardly sufficiently far to substantially completely close the discharge from the pressure-stabilizing groove 116 by the cylindrical portion 126 of the discharge valve 122, the valves 98 will then have moved sufficiently outwardly to completely open the slots 86, thus admitting the full permissible quantity of oil to flow into the pump and, since the oil is under relatively high suction, it will enter the inlet ports 64 in sufficient volume to supplant and arrest the flow of the air from the passages 80. Thus the pump will be acting only on oil to the complete exclusion of air and since the discharge from the groove 116 is closed extremely high resistance will be introduced into the gear system and substantially a 1-to-1 ratio of drive will be established between the driving shaft 10 and the driven shaft 44.

Although a single specific embodiment of the invention is shown and described herein, it is to be understood that the invention is not to be limited thereto, but shall encompass all modifications falling fairly within the scope of the appended claims.

I claim:

1. In a variable speed hydraulic coupling comprising a rotatable casing partially filled with oil whereby, during its rotation, there is provided within the casing an outer annular zone of oil and an inner central zone of air, a driven member mounted for rotation coaxial with said casing, a gear pump type transmission mechanism within said casing having elements operatively connecting said casing to said driven member, said transmission mechanism including a plurality of fluid inlet ports and a plurality of fluid discharge ports: the improvement which consists in the provision of a manifold plate for said discharge ports arranged within said casing transverse to the axis thereof, and having an axially disposed cylindrical valve seat provided with a circumferential pressure-stabilizing groove in an inner cylindrical wall thereof disposed within the zone of air, passages in said manifold plate communicating with said discharge ports and with said pressure-stabilizing groove, a single cylindrical fluid discharge control valve mounted for axial movement on said valve seat within the zone of air, said valve being provided with lateral fluid discharge passages having inlet openings in the peripheral wall of said valve, and means connected to said valve extending exteriorly of said casing, operable during the rotation of said casing, for axially moving said valve whereby said inlet openings are progressively shifted relatively to said pressure-stabilizing groove to thereby meter the flow of fluid discharged from said pressure-stabilizing groove through said lateral passages into said casing, said valve being movable to a position wherein said inlet openings are not in registration with said pressure-stabilizing groove to thereby arrest the flow of fluid from said discharge ports.

2. In a fluid circulation control means for power-transmitting pumping means mounted within a rotatable casing of a variable speed fluid coupling comprising: a fluid intake manifold plate, a fluid discharge manifold plate, power-transmitting pumping means disposed within the casing axially between said manifold plates and provided with a plurality of fluid inlet ports and a plurality of fluid discharge ports, said manifold plates being mounted within the casing and extending transversely to the axis of the casing into an outer annular zone of oil and into an inner central zone of air when the casing is rotating, said intake manifold plate containing a plurality of radially disposed air intake passages extending transversely to the axis of the casing from their constantly open ends within the zone of air into the zone of oil whereat said air intake passages communicate with said fluid inlet ports and said intake manifold plate also containing a plurality of oil intake passages disposed within the zone of oil having outlet portions communicating with the outlet portions of said radially disposed air intake passages: the improvement which consists of an oil intake control valve for each of said oil intake passages, an element operatively connecting all of said oil intake control valves, a plurality of radially disposed fluid discharge passages in said discharge manifold plate extending transversely to the axis of the casing and communicating at their inlet ends with said fluid discharge ports, a single fluid discharge control valve mounted within the zone of air for controlling the discharge of fluid from said fluid discharge passages, means operatively connecting said single discharge control valve with said element, and means connected with said single discharge control valve extending exteriorly of the casing adapted to impart simultaneous movement to all of said valves during the rotation of the casing.

SCOTT H. GASCHE.

References Cited in the file of this patent

UNITED STATES PATENTS

| Number | Name | Date |
|---|---|---|
| Re. 22,577 | Thomas | Dec. 12, 1944 |
| 471,656 | Strong | Mar. 29, 1892 |
| 2,371,227 | Dodge | Mar. 13, 1945 |
| 2,420,305 | Donahew | May 13, 1947 |
| 2,496,635 | Ocheltree | Feb. 7, 1950 |
| 2,526,914 | Thomas | Oct. 24, 1950 |
| 2,531,014 | Thomas | Nov. 21, 1950 |